United States Patent
Gaio et al.

[11] Patent Number: 5,901,263
[45] Date of Patent: May 4, 1999

[54] HOT PLUGGABLE MODULE INTEGRATED LOCK/EXTRACTION TOOL

[75] Inventors: David P. Gaio; Tim K. Murphy; Raymond J. Thatcher, all of Rochester; Miles F. Swain, Hayfield, all of Minn.

[73] Assignee: International Business Machines Corporation, Armonk, N.Y.

[21] Appl. No.: 08/928,389

[22] Filed: Sep. 12, 1997

[51] Int. Cl.[6] .................................................... G02B 6/36
[52] U.S. Cl. .............................. 385/92; 385/88; 385/89
[58] Field of Search ........................ 385/88–92; 439/567, 439/572, 573, 577, 352; 361/785, 752

[56] References Cited

U.S. PATENT DOCUMENTS

| | | | |
|---|---|---|---|
| 4,678,264 | 7/1987 | Bowen et al. | 385/89 |
| 4,798,430 | 1/1989 | Johnson et al. | 385/78 |
| 4,993,803 | 2/1991 | Suverison et al. | 385/88 |
| 5,039,194 | 8/1991 | Block et al. | 383/88 |
| 5,069,522 | 12/1991 | Block et al. | 385/39 |
| 5,071,219 | 12/1991 | Yurtin et al. | 385/78 |
| 5,202,943 | 4/1993 | Carden et al. | 385/92 |
| 5,416,871 | 5/1995 | Takahashi et al. | 385/88 |
| 5,487,678 | 1/1996 | Tsuji et al. | 439/352 |
| 5,528,408 | 6/1996 | McGinley et al. | 359/152 |
| 5,546,281 | 8/1996 | Poplawski et al. | 361/752 |
| 5,561,727 | 10/1996 | Akita et al. | 385/88 |
| 5,596,665 | 1/1997 | Kurashima et al. | 385/88 |

FOREIGN PATENT DOCUMENTS

| | | |
|---|---|---|
| 4165312 | 4/1992 | Japan . |
| 4230978 | 4/1992 | Japan . |
| 4270305 | 4/1992 | Japan . |
| 2297007 | 7/1996 | United Kingdom . |

OTHER PUBLICATIONS

Baldwin et al., *Fiber Optic Module Interface Attachment*, Research Disclosure, Kenneth Mason Publications Ltd. Oct. 1991, No. 330.

Block et al., *Optical Link Card Guide/Retention System*, Research Disclosure, Kenneth Mason Publications Ltd. Apr. 1993, No. 348.

Block et al., *Field Replaceable Optical Link Card*, IBM Technical Disclosure Bulletin vol. 37 No. 02B Feb. 1994.

Jarvela, R. A., *Package for Electrical and Optical Compenents of Communications Port of Data Processing System*, IBM Technical Disclosure Bulletin vol. 27 No. 8, Jan. 1985.

Soderstrom et al., *CD Laser Optical Data Links for Workstations and Midrange Computers*, Electronic Components and Technology Conference, Jun., 1993.

*Primary Examiner*—Hemang Sanghavi
*Attorney, Agent, or Firm*—Stephen W. Barns; Scott A. Stinebruner

[57] ABSTRACT

The invention provides a locking bail that when in the locked position prevents the removal of an optical link module from a host system and when in the unlocked position provides a handle that facilitates the removal of an optical link module. By providing a locking bail, the packing density of modules in a host may be increased. The bail provides a handle which is accessible from the front of the module when the module is unlocked. The locking bail typically engages inclined planes on latch arms that secure an optical link module to the host system.

22 Claims, 8 Drawing Sheets

HOT PLUGGABLE MODULE INTEGRATED LOCK/EXTRACTION TOOL

FIELD OF THE INVENTION

The invention is generally related to an integrated lock and extraction tool for use in electro-optic ports such as hot pluggable modules, and more particularly, to a locking mechanism which allows the optical modules to be densely packed within a host system.

GOVERNMENT RIGHTS

This invention was made with U.S. Government support under Cooperative Agreement F33615-94-2-1582 awarded by the U.S. Department of Air Force. The government has certain rights in the invention.

BACKGROUND OF THE INVENTION

In order to transfer data between computer systems rapidly and reliably, electro-optic data transmission is increasingly being used as the method of choice. Optical fibers provide resistance to electro-magnetic interference, increased security, and increased speed due to a wide potential band width. Optical fibers transmit data from an electro-optical transducer, such as a laser or light emitting diode (LED) to an electro-optical receiver which generates electrical information based upon the signal received. An optical fiber includes a core region which is coated by an annular clad. The core region has an index of refraction greater than that of the clad, so that light is transmitted through the core by total internal refraction. The optical fibers are typically either threaded onto the electro-optical components or latched by the use of connectors such "SC" connectors.

Hot pluggable optical link modules are inserted and removed from a host system, such as a data processing system and typically are secured to a port in the host system by a latching system which is accessed from the side of the module. When designing a host system, space is provided on the sides of the module to allow removal of the module, greatly decreasing the density of the optical modules in the system.

Consequently, a need exists in the art for a lockable connector which will provide a host system having a high packing density of optical link modules. Specifically, a significant need continues to exist for a locking mechanism which provides a connection between the host system and the optical link module without the need to access the module from the side.

SUMMARY OF THE INVENTION

The invention addresses these and others problems associated in the art with connections of host systems to components such as hot pluggable optical link modules in a high speed optical data transfer system. The present invention provides a locking bail which, when in the locked position, prevents the removal of an optical link module from a host system and provides a path to ground any errant electrical charge. When in the unlocked position the locking bail provides a handle that facilitates the removal of the module. By providing a locking bail, the modules may be densely packed in the host system because there is no need to access the sides of the modules during removal.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION OF THE INVENTION

Figure 1:
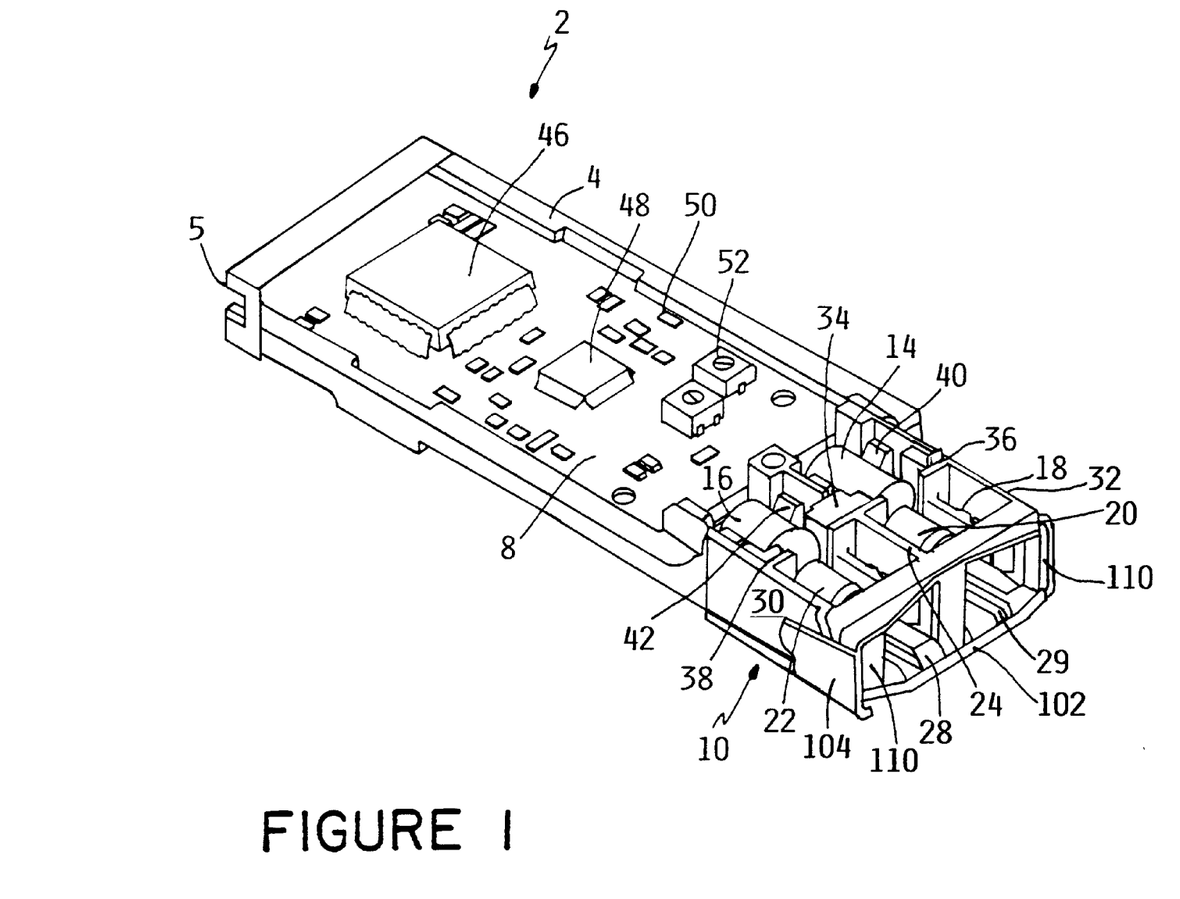
FIG. 1 is a perspective view showing an optical link module including the locking bail consistent with the present invention.

Turning to the Drawings wherein like numbers denote like parts throughout the several views, FIG. 1 illustrates the general configuration of an exemplary optical link module 2 and shows the basic operation of the various embodiments of the present invention. Optical link module 2 represents a fiber optic communications package which is mounted within a component of a data processing system such as a computer system that transfers data to and from another component of the computer system or another computer system such as network servers, mid-range computers, mainframe computers, work stations, desktop computers, portable computers, and the like. One such suitable computer system in which the optical link module 2 may be used is a mid-range computer such as the AS/400 computer available from International Business Machines Corporation. The optical link module is also suitable for use in other communications systems or optical transmission networks, such as those used in telephone service.

The optical link module 2 generally includes a frame 4 that is integrally connected to a multi-pin connector 5 and an optical fiber connection unit 10. Frame 4, multi-pin connector 5 and optical fiber connecting unit 10 generally surround a printed circuit board 8. The printed circuit board 8 typically carries integrated circuit chips 46, 48, as well as other electronic components such as resistors 50 and potentiometers 52. Typically, the circuit board 8 includes a module that performs parallel electrical signal to serial optical conversion at rates of approximately 1000 Mbits/sec. The module also performs serial optical to parallel electrical conversion at a similar rate.

In a hot pluggable module, the pins of multi-pin connector 5 extend away from the printed circuit board 8 in parallel to the plane of the board. The pin connector 5 may be an eighty position straddle mount connector. Due to the orientation of pin connector 5, it is possible to slide module 2 into the face of a host system, make an electrical connection, and latch the module in place without depowering the host system.

Transmitter and receiver integrated circuits are typically located on one side of the circuit board to provide duplex operation. A pair of electro-optical components, namely an emitter 14 and a receiver 16, perform the conversion between electrical and optical signals. Typically the module receives serial electrical signals from the CPU and emitter 14, such as an LED or laser, converts the serial electrical signal to a serial optical signal for transmission through an optical fiber. The module may also receive parallel electrical signals from a CPU and convert the parallel electrical signal to a serial electrical signal that is provided to the emitter 14. Emitter 14 in turn converts the serial electrical signal to a serial optical signal for transmission through an optical fiber. Similarly, incoming serial optical signals are converted by a receiver 16, such as a PIN photodiode, from the optical signal to a serial electrical signal. The serial electrical signal may be output to the CPU as a serial signal or converted to a parallel electrical signals and transmitted to the CPU. Similarly, emitter 14 and receiver 16 may transmit a parallel signal in which case it is possible to omit the parallel to serial conversion or it may be possible to convert a serial electrical signal to a parallel signal for parallel optical transmission.

The emitter 14 and receiver 16 are each held within optical fiber connection unit 10 by pairs of cantilevered opposed latching arms 40, 42.

Figure 2:
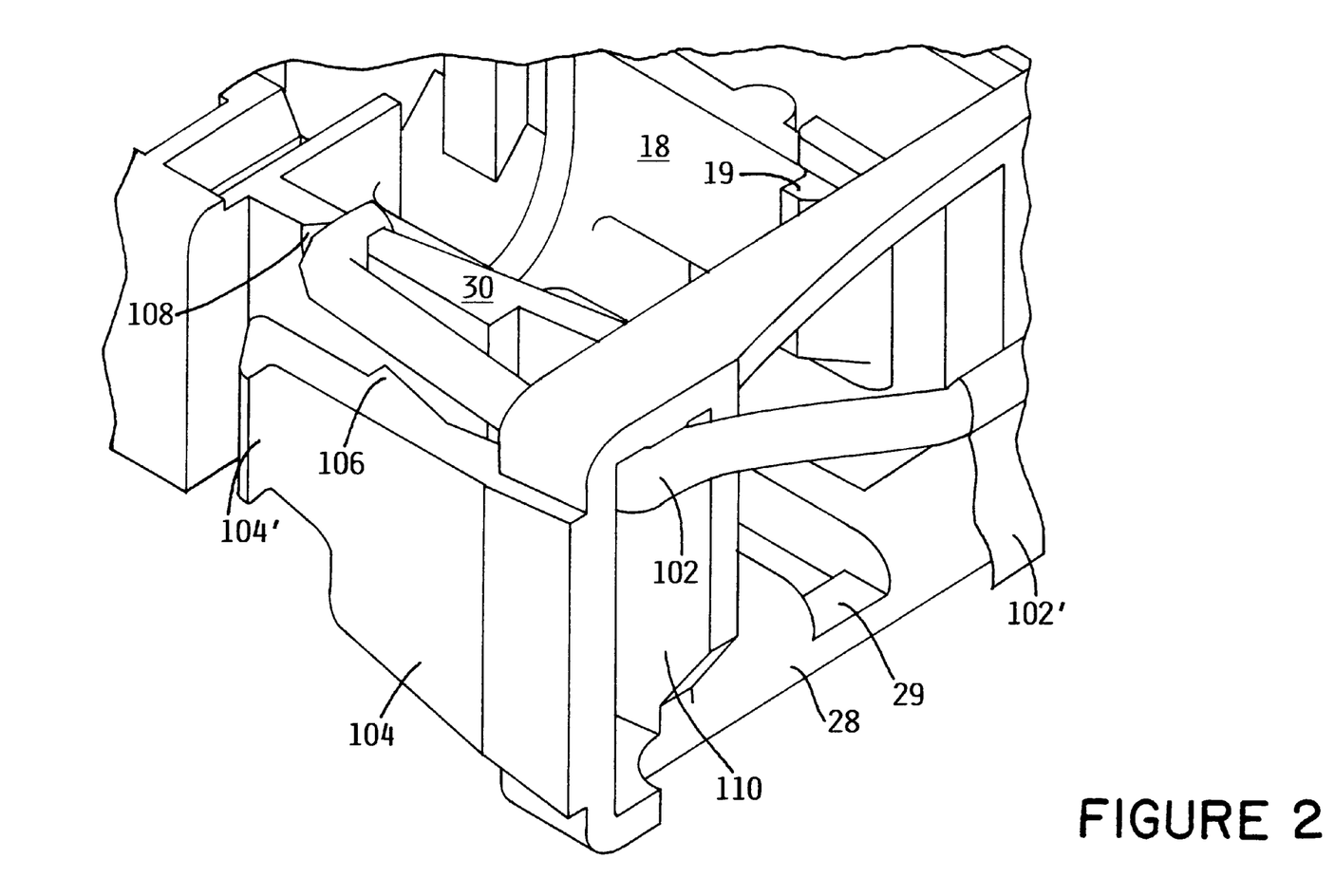
FIG. 2 is a perspective view, in detail, showing an optical link module including the locking bail consistent with the present invention.
Figure 3:
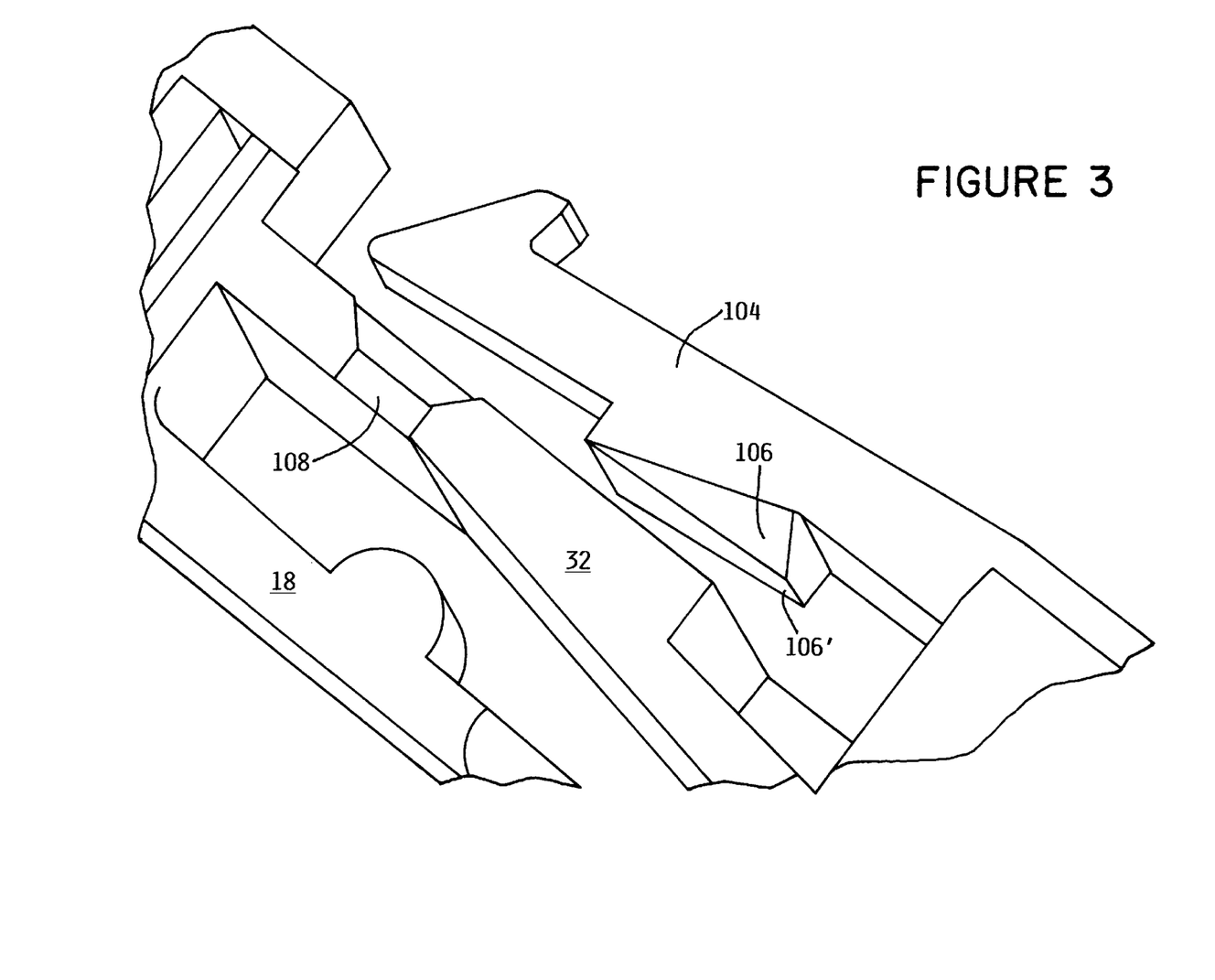
FIG. 3 is a perspective view, in detail, showing an optical link module including a latch suitable for use with the locking bail consistent with the present invention.

With reference to FIG. 1, the optical fiber connection unit 10 is typically an injection molded unit that is attached to the optical link module frame 4. As seen in FIGS. 2 and 3, the optical fiber connection unit is molded with retaining clips 104 having detents 104' projecting outwardly therefrom. Outer walls 30, 32 of optical fiber connection unit 10 are molded with a hinge area 108 to receive bail 102. The face of the optical fiber connection unit 10 is molded with a guide track 110 which retains and guides bail 102. The bail may be formed of a metal such as a wire or may be formed of a polymer material.

After insertion, bail 102 is rotatable about an axis passing through hinge 108 and is kept in place by inclined plain 106 and guide track 110. Bail 102 rotates about hinge 108 between a locked and unlocked position. In the several views, the bail 102 is in the latched position when down, as shown in FIG. 1, and in the unlatched position when in the up position, as shown in FIG. 2. When in the unlatched up position the bail 102 does not forcibly contact inclined plane 106. When pressed into the latched or down position the bail 102 rides up inclined plane 106 to plateau 106' and the retaining clips 104 are forced outwardly to contact the host system. Bail 102 may optionally include a tab 102' which is used to assist removal of module 2 and may also be used to label the module. Tab 102' may be formed of a self-adhesive sheet which is wrapped around bail 102 so that the sheet adheres to the bail and to an opposing portion of tab 102'. When inserted bail 102 provides a path to ground any errant electrical charge. Typically, retaining clips 104 are molded so that the module 2 may enter into the host system without detents 104' latching with the retaining system of the host.

Figure 5:
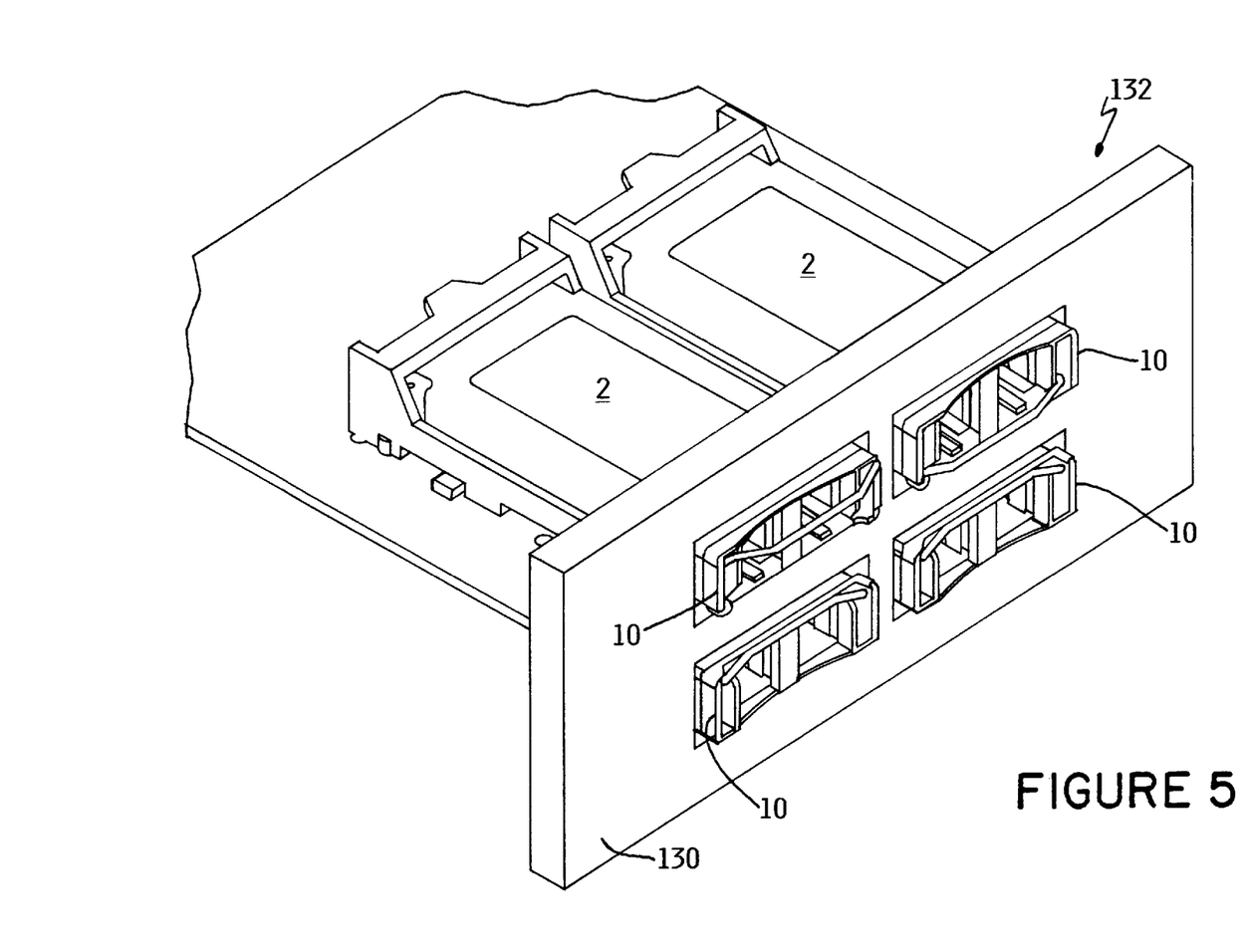
FIG. 5 is a perspective view of a front plate of a host system showing densely packed optical link modules including the locking bail consistent with the present invention.

As seen in FIG. 5 the optical fiber connection units 10 of a number of modules 2 are densely packed on the face plate 130 of host system 132. Since the optical fiber connection units 10 are so densely packed, bail 102 is used to release the retaining clips 104, and is then used as a handle. A tab 102', as shown in FIG. 2, may be applied to bail 102 to ease the use of the bail. Tab 102' may also bear indicia to assist in determining which module is to be removed.

Figure 6A:
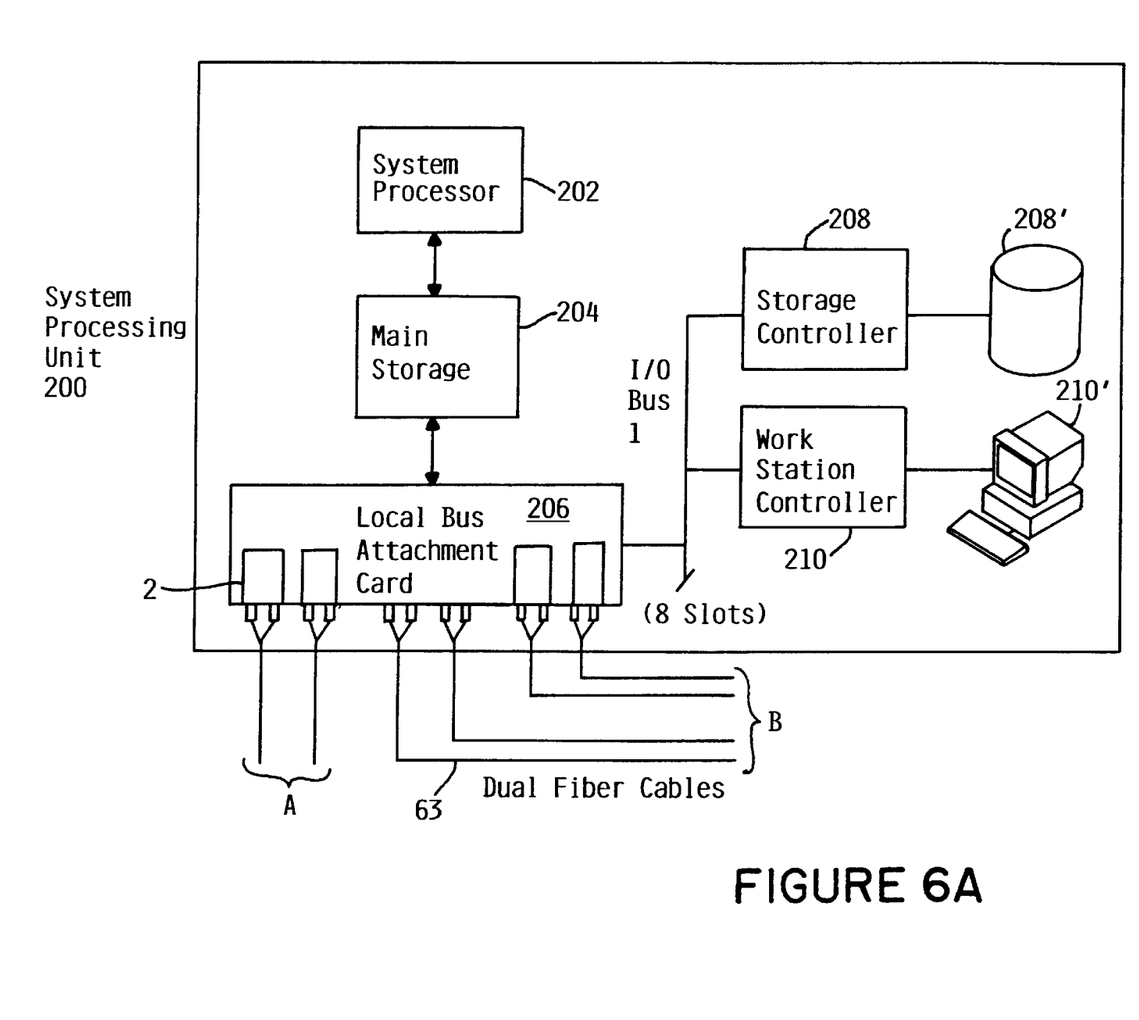
FIG. 6 is a schematic of a computer system using optical link modules.
Figure 6B:
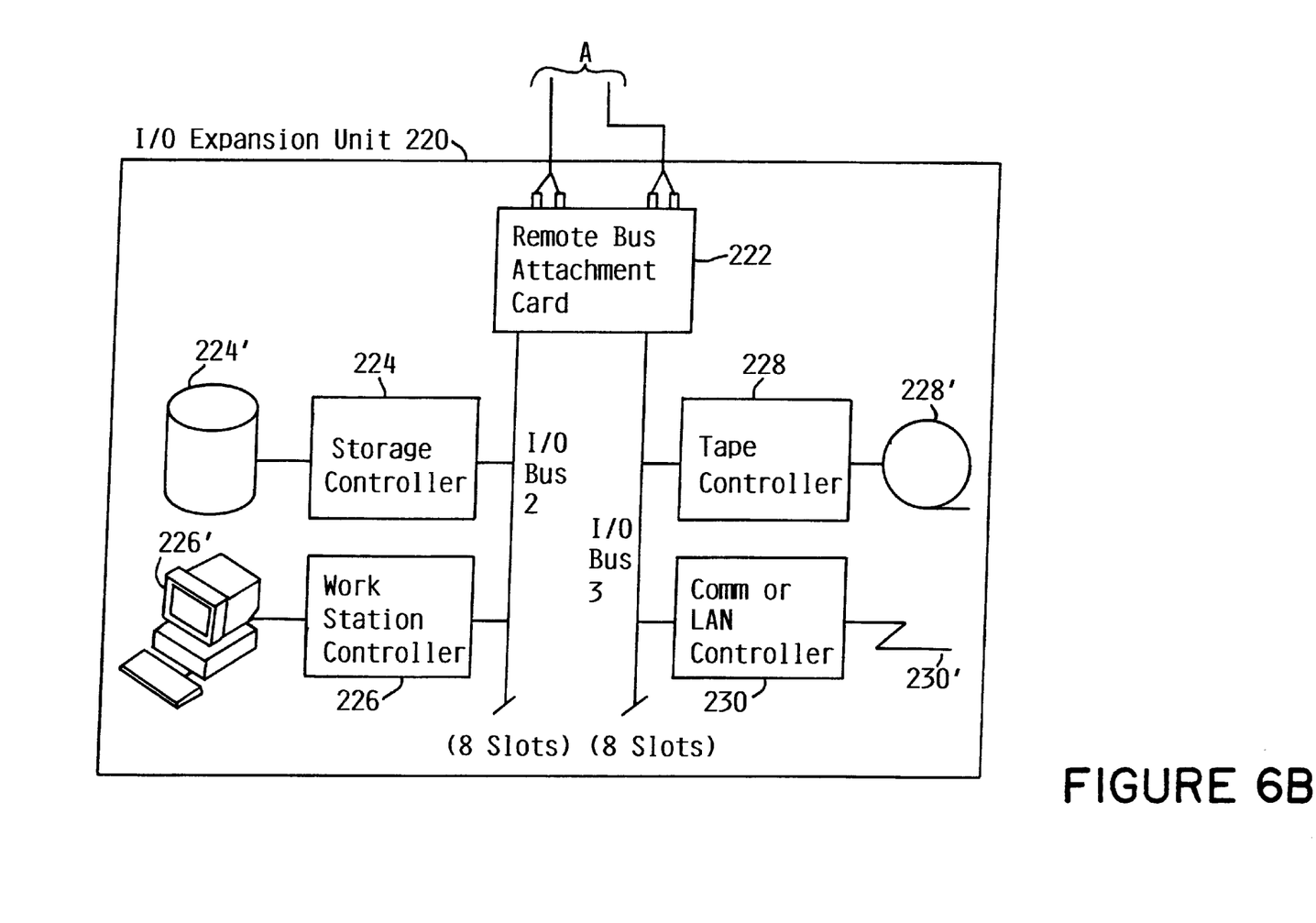
Figure 6C:
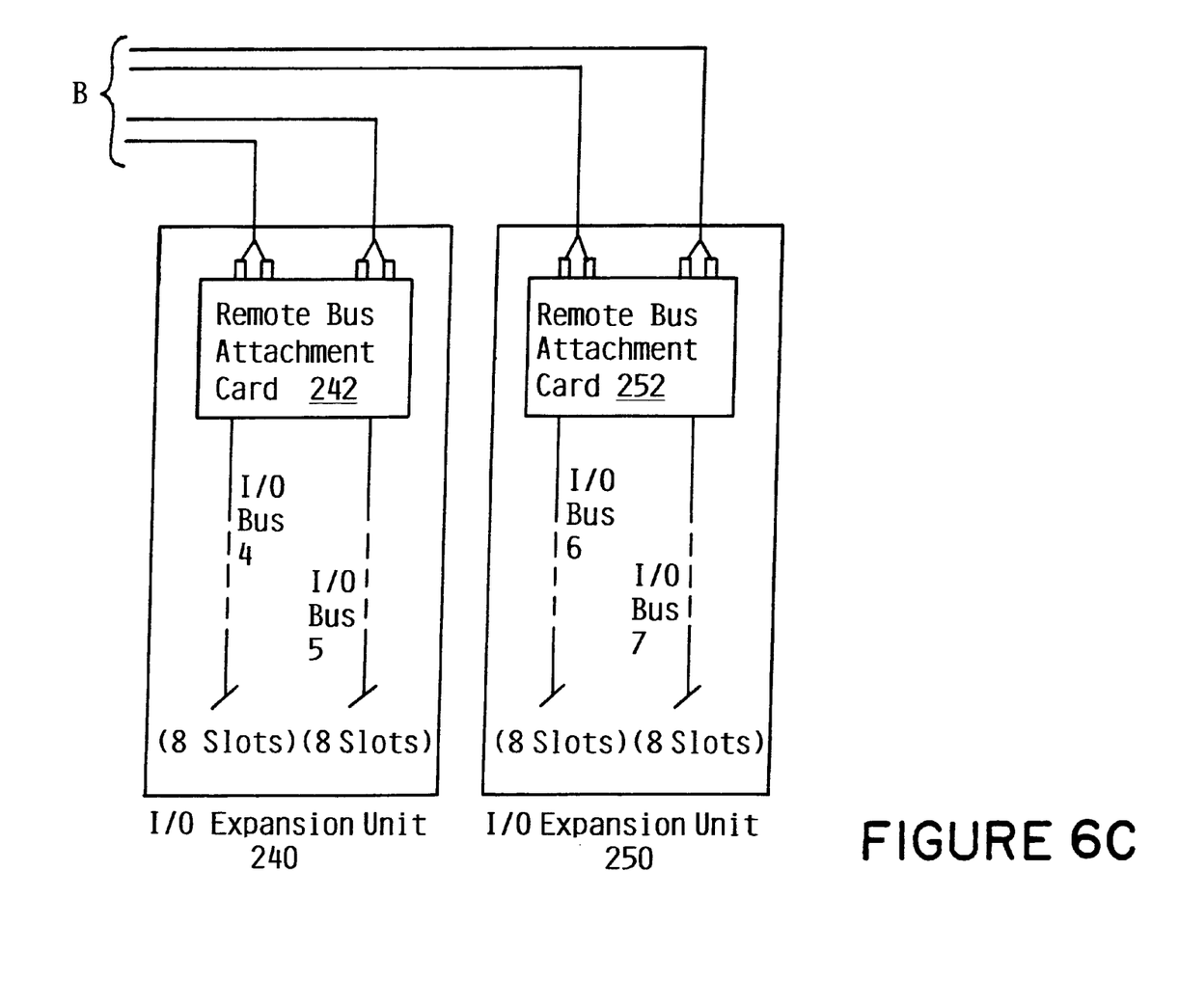

As seem in FIG. 6, a typical computer system using module 2 may include a system processing unit 200 including a system processor 202, a main storage unit 204, a local bus attachment card 206 including modules 2, a storage controller 208, with storage device 208', and work station controller 210, with work station 210'. The local bus attachment card 206 connects system processing unit 200 to input/output expansion units 220, 240 and 250 by dual fiber cables 63. Input/output expansion unit 220, includes remote bus attachment card 222, linked via I/O buses to storage controller 224, with storage device 224', work station controller 226, with work station 226', tape controller 228, with tape drive 228', and a comm or LAN controller 230, with comm or LAN 230'. Input/output expansion unit 240, includes remote bus attachment card 242, linked via I/O buses to various components (not shown). Input/output expansion unit 250, includes remote bus attachment card 252, linked via I/O buses to various components (not shown).

The optical fiber connection unit 10 is substantially as disclosed in U.S. patent application Ser. No. 08/928,119, entitled "Internal Shield For A Fiber Optic Communication Port" Inventor Gaio et al., filed Sep. 12, 1997 which is incorporated by reference herein. Optical fiber connection unit 10 includes a lower platform 28 that supports emitter 14, receiver 16, and the female end of a duplex "SC" connector. The lower surface 28 supports left and right side walls 30, 32 respectively as viewed in FIG. 1. Lower surface 28 also supports a medial T-shaped bar 24 that separates the send and receive fiber connectors of the duplex "SC" connector 60, shown in FIG. 4. Grooves 29 are located on lower surface 28 to receive ridges 70, 82 of the male duplex "SC" connector. When in the down or latched position, bail 102 is below the level of grooves 29 so that there is no interference with the insertion of the duplex "SC" plugs 60 by bail 102.

Side walls 30, 32 of optical fiber connection unit 10 include electro-optic component retainers 36, 38. In addition, a central retainer 34 is defined by the top section of the medial T-shaped bar 24 that is in the same plain as retainers 36, 38. In assembling the optical link module 10, emitter 14 and receiver 16 are snapped in place between cantilevered arms 40, 42.

Figure 4:
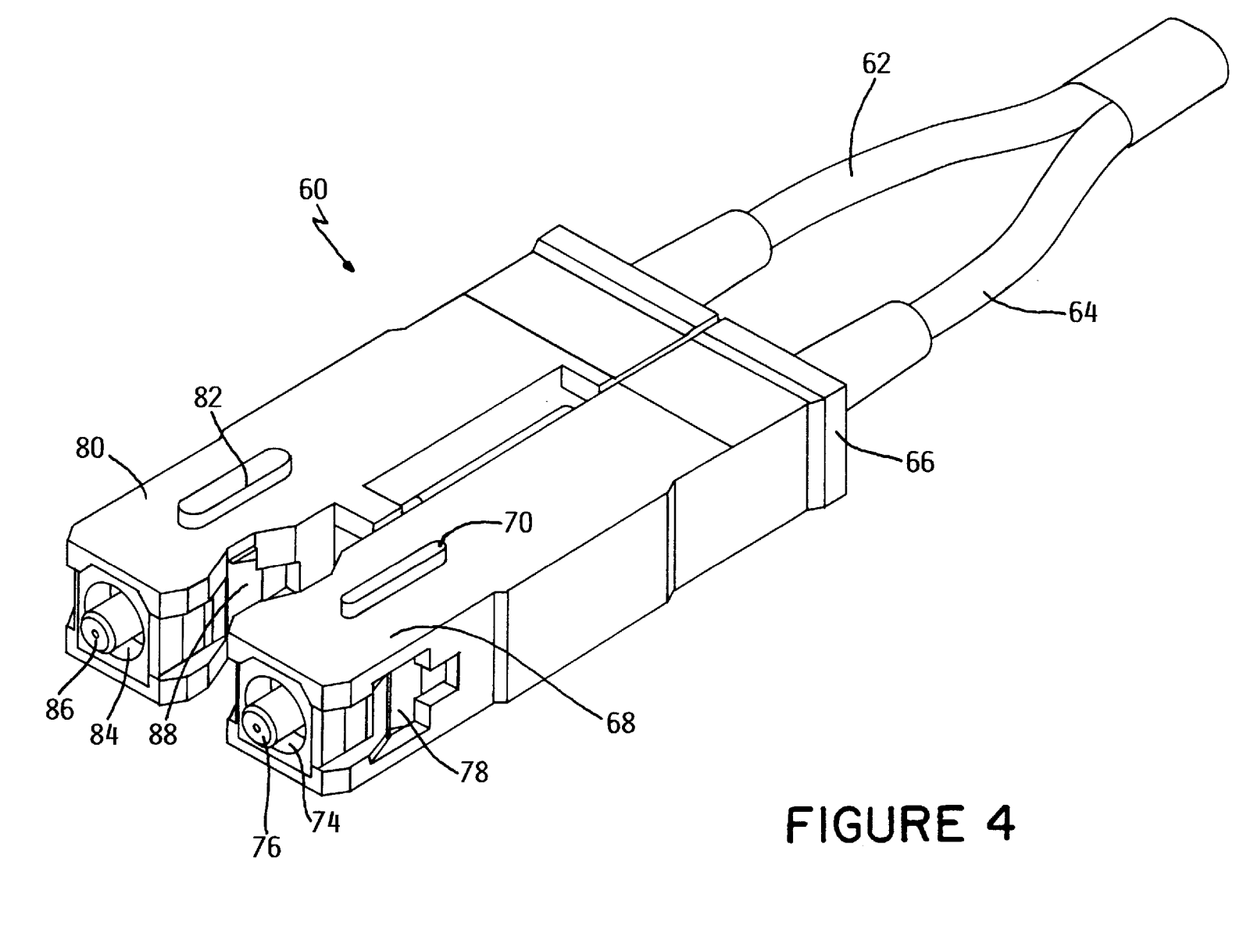
FIG. 4 is a perspective view of the male end of a duplex "SC" optical connector.

In the male end of the duplex "SC" connector 60, optical fibers 62, 64 pass through the back plate 66. Connector 60 includes a fiber connector 68 that is generally in the form of a right rectangular parallelepiped having a medial ridge 70 to ensure proper alignment. The medial ridge 70 mates with grove 29 that is included in the lower surface 28 of the optical fiber connection unit 10. The connector portion 68 includes a cylindrical bore 74 at the center of which is a ferrule 76. The optical fiber 64 is threaded through the back plate 66 and through ferrule 76. The connection unit 68 is inserted into optical fiber connection unit 10 so that ferrule 76 is received within the distal ferrule receiving end 20 of emitter 14. The optical fiber receiving unit 68 includes depressed regions 78 on opposite sides to receive detents 19 of cantilevered arms 18.

Similarly, connector 60 includes a another fiber connector 80, which is of the same structure as fiber connector 68. The medial ridge 82 mates with grove 29 included in the lower surface 28 of the optical fiber connection unit 10. The cylindrical bore 84 includes a ferrule 86 having optical fiber 62 threaded therethrough. The connection unit 80 is inserted into optical fiber connection unit 10 so that ferrule 86 is received within the distal ferrule receiving end 22 of receiver 16. The optical fiber receiving unit 80 includes depressed regions 88 on opposite sides to receive detents 19 of cantilevered arms 18.

It should be appreciated that the above-described locking bail may be implemented in any connector known in the art.

In particular, the above-described duplexed "SC" connector could be configured as a single "SC" connector or the connect could be any other known type of connector. Other configurations of optical links may also be used with the locking bail of the present invention. It should be appreciated that implementation of the locking bail with other optical links is well within the capabilities of one of ordinary skill in the art. For example it is contemplated that a detent or recess may be formed on the plateau of the inclined plane. Further, while the locking bail is shown as rotating from an upper unlocked position to a lower locked position, it is contemplated that the bail could be rotated from left to right or may be locked in the upper position without departing from the spirit and scope of the invention.

Various modifications may be made to the illustrated embodiments without departing from the spirit and scope of the invention. Therefore, the invention lies solely in the claims hereinafter appended.

What is claimed is:

1. A lockable optical fiber link module, comprising:
    a frame;
    an electronic circuit mounted within the frame;
    an optical fiber connection unit configured to interface with at least one optical fiber;
    at least one resilient latch, having a secured position and an unsecured position, configured to secure the frame to a host system;
    a locking bail connected to the frame and movable so as to move the at least one resilient latch between the secured position and the unsecured position.

2. The lockable optical fiber link module of claim 1, wherein said at least one latch includes an inclined plane, adjacent the locking bail, configured to translate the latch between the unsecured and the secured positions based upon the movement of the locking bail.

3. The lockable optical fiber link module of claim 1, further comprising:
    a hinge, having an axis of rotation.

4. The lockable optical fiber link module of claim 3, wherein the locking bail rotates about the axis of rotation of the hinge to translate the latches parallel to the axis between a secured and an unsecured position.

5. The lockable optical fiber link module of claim 1, further comprising:
    an inclined plane on each latch, adjacent the locking bail;
    a hinge, having an axis of rotation, formed in the frame, whereby the locking bail rotates about the axis of rotation of the hinge between a position engaged with the inclined plane and a position disengaged from the inclined plane to change the position of the latch between a secured and an unsecured position.

6. The lockable optical fiber link module of claim 1, further comprising:
    a multi-pin connection unit attached to the frame, configured to transmit data from the electronic circuit to a host system.

7. The lockable optical fiber link module of claim 6, wherein the resilient latch is located at a distance from the multi-pin connection unit.

8. The lockable optical fiber link module of claim 7, wherein the pins of the multi-pin connection unit extend in a direction parallel to the plane of the electronic circuit and away from the resilient latch, whereby the optical fiber link module is connected to a host as the resilient latch engages a host system.

9. The lockable optical fiber link module of claim 1, wherein the locking bail provides a grip during removal of the module from a host.

10. The lockable optical fiber link module of claim 9, further comprising:
    a sheet adhered to the bail to assist in removal of the module.

11. The optical fiber link module of claim 1, further comprising:
    two resilient latches on opposite sides of the frame.

12. The lockable optical fiber link module of claim 11, further comprising:
    an inclined plane on each latch, adjacent the locking bail; and
    a hinge, having an axis of rotation, formed in the frame, whereby the locking bail rotates about the axis of rotation of the hinge between a position engaged with the inclined plane and a position disengaged from the inclined plane to change the position of the latch between a secured and an unsecured position.

13. The optical fiber link module of claim 1, further comprising two resilient latches on opposite sides of the optical fiber connection unit.

14. The lockable optical fiber link module of claim 11, further comprising:
    an inclined plane on each latch, adjacent the locking bail; and
    a hinge, having an axis of rotation, formed in the frame, whereby the locking bail rotates about the axis of rotation of the hinge between a position engaged with the inclined plane and a position disengaged from the inclined plane to change the position of the latch between a secured and an unsecured position.

15. A data transfer system including a lockable optical fiber link module, comprising:
    a frame with an optical fiber connection unit;
    an electronic circuit mounted within the frame;
    first and second electro-optical components, connected to the electronic circuit, each having a distal ferrule receiving end;
    two resilient latches on opposite sides of the optical fiber connection unit;
    a locking bail;
    an inclined plane on each latch, adjacent the locking bail; and
    a hinge, having an axis of rotation, formed in the frame, whereby the locking bail rotates about the axis of rotation of the hinge between a position engaged with the inclined plane and a position disengaged from the inclined plane to change the position of the latch between a secured and an unsecured position.

16. A data transfer system, comprising:
    a face plate;
    a plurality of orifices in the face plate;
    a plurality of optical fiber link modules received with the orifices;
    resilient latches on opposite sides of the optical fiber link modules configured to secure the optical fiber link modules to the face plate;
    an inclined plane on each latch;
    a locking bail adjacent each inclined plane; and
    a hinge, having an axis of rotation, formed in each optical fiber link module whereby the locking bail rotates about the axis of rotation of the hinge, between a position engaged with the inclined plane and a position disengaged from the inclined plane, to change the position of the latch between a secured and an unsecured position.

17. The data transfer system of claim 16 wherein the locking bail is accessible from a position in front of the face plate.

18. The data transfer system of claim 16, further comprising a flexible tab adhered to the locking bail.

19. The data transfer system of claim 16, wherein the plurality of optical fiber connection units further comprise:

a frame;

a electronic circuit mounted within the frame; and a plurality of electro-optical components having a distal ferrule receiving end, connected to the electronic circuit.

20. The data transfer system of claim 16, wherein the plurality of lockable optical fiber link modules are hot pluggable.

21. A computer system comprising:

a memory;

a processor coupled to the memory;

an external interface coupled to the processor through a bus;

a plurality of orifices in the bus;

a plurality of optical fiber link modules received with the orifices;

resilient latches on opposite sides of the optical fiber link modules configured to secure the optical fiber link modules to the bus;

an inclined plane on each latch;

a locking bail adjacent each inclined plane; and a hinge, having an axis of rotation, formed in each optical fiber link module whereby the locking bail rotates about the axis of rotation of the hinge, between a position engaged with the inclined plane and a position disengaged from the inclined plane, to change the position of the latch between a secured and an unsecured position.

22. The computer system of claim 21 wherein the module couples the processor to a device selected from the group consisting of a storage controller, a work station controller, a tape controller, a communication controller, and a network controller.

* * * * *